United States Patent [19]

Okabayashi

[11] Patent Number: 5,309,770
[45] Date of Patent: May 10, 1994

[54] FLUID VIBRATING TYPE FLOWMETER

[75] Inventor: Makoto Okabayashi, Nabari, Japan

[73] Assignee: Osaka Gas Co., Ltd., Osaka, Japan

[21] Appl. No.: 848,425

[22] Filed: Mar. 6, 1992

[30] Foreign Application Priority Data

Mar. 6, 1991 [JP] Japan .................. 3-039761
Mar. 6, 1991 [JP] Japan .................. 3-039762

[51] Int. Cl.$^5$ .............................................. G01F 1/20
[52] U.S. Cl. ............................................. 73/861.19
[58] Field of Search ................... 73/861.19, 861.21

[56] References Cited

FOREIGN PATENT DOCUMENTS 0030628 2/1983 Japan .................. 73/861.23

OTHER PUBLICATIONS

Yamasaki et al.: "A New Fluidic Oscillator of 2 Dimensional Jet and Its Application to Flowrate Measurement", 1988.

Primary Examiner—Herbert Goldstein
Attorney, Agent, or Firm—Gifford, Groh, Sprinkle, Patmore and Anderson

[57] ABSTRACT

A fluid vibrating type flowmeter has a nozzle disposed in a flow passage and defining a nozzle outlet plane extending perpendicular to the flow passage, an enlarged passage disposed downstream of the nozzle and including divergent inner wall surfaces symmetric about an axis of the nozzle, a target disposed centrally of the enlarged passage for obstructing straight movement of streams jetting out of the nozzle, and a constructed passage disposed downstream of the enlarged passage and having a smaller passage width than a rear end of the enlarged passage. Each of the divergent inner wall surfaces includes a main arcuate section continuous from the nozzle outlet plane, a straight diverging wall section continuous from the main arcuate section, and an auxiliary arcuate section continuous at an upstream end thereof from the straight diverging wall section and at a downstream end thereof with the constricted passage. The straight diverging wall section is formed as a common tangent of the main arcuate section and auxiliary arcuate section. The main arcuate section has a radium R and the auxiliary arcuate section has a radius r, these radii being in relations expressed by $$r/R = 0.5$$
$$L/R = 1.5, \text{ and}$$
$$x/R = (\sqrt{3})/2,$$

wherein L is a distance between the nozzle outlet plane and the center of the auxiliary arcuate section, and x is a distance between the center of the auxiliary arcuate section and a passage axis.

6 Claims, 8 Drawing Sheets

FLUID VIBRATING TYPE FLOWMETER

BACKGROUND OF THE INVENTION

1. Field of the Invention

The present invention relates to fluid vibrating type flowmeters for measuring flow rates of various fluids (gases and liquids), such as gas meters, and more particularly to a fluid vibrating type flowmeter including a nozzle mounted in a flow passage and defining an outlet plane extending perpendicular to the flow passage, an enlarged passage continuous with a nozzle outlet and having diverging passage walls symmetric about an axis of the nozzle, a target disposed centrally of the enlarged passage for blocking straight movement of streams jetting out of the nozzle, and a constricted passage disposed downstream of the enlarged passage and having a smaller passage width than the enlarged passage.

2. Description of the Related Art

Fluid vibrating type flowmeters of the type noted above which have been proposed heretofore include a flowmeter as shown in FIG. 12. The operating principle of this fluid vibrating type flowmeter will be described briefly first. Streams jetting out through a nozzle outlet plane 11 are divided into main jet streams L1 flowing round a target 20 and out through a constricted passage, and return steam L2 branching from the main jet streams L1 and impinging upon downstream positions of the enlarged passage or a narrowing section defining the constricted passage to flow backward through the flow passage. With this type of flowmeter, when fluid jets out of the nozzle, the jet streams are drawn by Coanda effect to one of side walls 50 and 51 extending along the flowing direction. That is, the jet streams are diverted to either side wall 50 or 51 instead of flowing straight. Then, the return flows L2 are generated which impart a fluid energy in a direction perpendicular to the straight flowing direction of the jet streams in the vicinity of the nozzle outlet plane. As a result, the jet streams will in the next step flow along the opposite side wall 50 or 51. Thus, the return flows L2 act as control flows for controlling the jet streams in the vicinity of the nozzle outlet, whereby the streams jetting out of the nozzle flow alternately along opposite sides of the target (the presence of the target effectively induces vibrations on a low flow rate side). With the flowmeter having only the target in the enlarged passage as shown in FIG. 12, vortices formed downstream of the target also influence such vibrations. Generally, the cycles of vibrations are proportional to the rate of fluid flow through the flowmeter. The rate of fluid flow through the passage is measured by using this phenomenon.

In the flowmeter including the enlarged passage having a substantially box-like configuration as shown in FIG. 12, mechanisms for detecting pressure or flow rate are arranged in a pair of measuring positions 55 immediately downstream of the nozzle outlet plane and opposed to each other across the jet streams. Flow rate is detected by measuring the number of vibrations based on the pressure differences or flow rate variations resulting from the phenomenon of the jet streams flowing alternately along the opposite sides of the target.

In the case of a gas meter, for example, allowable measurement errors (differences between an actual flow rate and detection values provided by a measuring device) generally are ±2.5% for a range of flow rates from 0.15 to 0.6 m³ per hour, and ±1.5% for a range of flow rates from 0.6 to 3 m³ per hour (which are shown in broken lines in FIG. 13). When measurement is taken with a flowmeter including an enlarged passage having a box-like configuration as shown in FIG. 12, errors occur as shown in a solid line in FIG. 13. FIG. 13 shows measurement errors (%) occurring with respect to correct detection values when flow rate is varied (0.1 to 5 m³ per hour). Such errors are hereinafter referred to as flow rate/device difference characteristics. In this measurement, the errors occurring for a very low flow rate range (0.15 to 0.4 m³ per hour) are ±4.4% far exceeding the allowable measurement criterion, and measurement values meeting the allowable measurement criterion are obtained only for the range of 0.4 to 2.1 m³ per hour. The values shown as ΔE in the drawings are values showing Emax (maximum value on the positive side—Emin (maximum value on the negative side) in flow rate/device difference characteristics, which form the basis for determining measurement stability. (In the embodiments and experiments discussed hereinafter, all tests of flow rate/device difference characteristics of flowmeters are carried out as in the above example, i.e. using air as a gas and covering a flow rate range up to 5 m³ per hour. This is based on consideration of variations in Reynolds number occurring with other types of gases such as propane gas when measurement is taken for 3 m³ per hour which is an upper flow rate limit of the allowance criterion.)

According to the allowance criterion, such numeric values are 5% for a low flow rate range and 3% for a high flow rate range. That is, the above conventional construction cannot be employed in a measuring instrument, and the prior art has room for improvement with respect to measuring precision.

With a view to solving the above problem, various configurations are conceivable for fluid vibrating type flowmeters satisfying the allowance criterion. It is desirable that principal pertinent dimensions are geometrically standardized for manufacture of such flowmeters.

SUMMARY OF THE INVENTION

The object of the present invention, therefore, is to provide a fluid vibrating type flowmeter covering a sufficiently large flow rate range to be measured, with errors reduced throughout the entire measurement range, such a fluid vibrating type flowmeter having a simple configuration of clear and plain principal dimensions.

The above object is fulfilled, according to the present invention, by a fluid vibrating type flowmeter in which each of the divergent inner wall surfaces includes a main arcuate section continuous from the nozzle outlet plane and having a first radius R, a straight diverging wall section smoothly continuous from the main arcuate section, and an auxiliary arcuate section continuous at an upstream end thereof from the straight diverging wall section and at a downstream end thereof with the constricted passage, the auxiliary arcuate section having a second radius r, the straight diverging wall section being formed as a common tangent of the main arcuate section and the auxiliary arcuate section, and the first radius R and the second radius r are in relations expressed by $$r/R = 0.5$$
$$L/R = 1.5, \text{ and}$$

-continued $$x/R = (\sqrt{3})/2,$$

where L is a first distance in a passage direction of the nozzle outlet plane to the center of the auxiliary arcuate section, and x is a second distance transversely of the passage of the center of curvature of the auxiliary arcuate section to a passage axis.

The above construction has the following functions and effects.

In the fluid vibrating type flowmeter according to the present invention, the enlarged passage includes, on either sides thereof, a main arcuate section, and a straight diverging wall section and an auxiliary arcuate section continuous therefrom, and the constricted passage is connected downstream of the auxiliary arcuate section. Streams jetting out of the nozzle smoothly become, in the enlarged passage, main jet flows and return flows branching from the main jet flows. As a result, fluid vibrations are generated effectively, and the flow rate/device difference characteristics meet the allowance criterion.

In the fluid vibrating type flowmeter having the above configuration, as shown in FIG. 3, the center of the nozzle in the nozzle outlet plane and centers of curvature of the respective auxiliary arcuate sections form the apexes of an equilateral triangle. Moreover, the centers of the main arcuate sections coincide with the center of gravity of this equilateral triangle. Thus, the positions of the centers of curvature of the auxiliary arcuate sections are determinable by extending downstream the arcs defining the main arcuate sections, and spotting positions satisfying L=1.5R which determine positions of the centers in the direction parallel to the passage. In addition, each straight diverging section defines a surface at an angle of 30 degrees to the passage axis (i.e. diverging downstream), which may readily be drawn and determined by using an ordinary set square. This, combined with the simplicity of radial relationship between the main arcuate section and auxiliary arcuate section, allows a scale-up and scale-down operation to be carried out in a very simple way when coping with changes in measurement ranges.

A fluid vibrating type flowmeter employing the construction according to the present invention is capable of measurement for a sufficiently large range of flow rates with reduced errors occurring throughout the entire range of measurement. Such a fluid vibrating type flowmeter has a very simple configuration with a clear and plain combination of principal dimensional relations.

Other features and advantages of the present invention will be apparent from the following description.

DETAILED DESCRIPTION OF THE PREFERRED EMBODIMENTS

A fluid vibrating type flowmeter embodying the present invention will be described in detail hereinafter with reference to the drawings.

Figure 1:
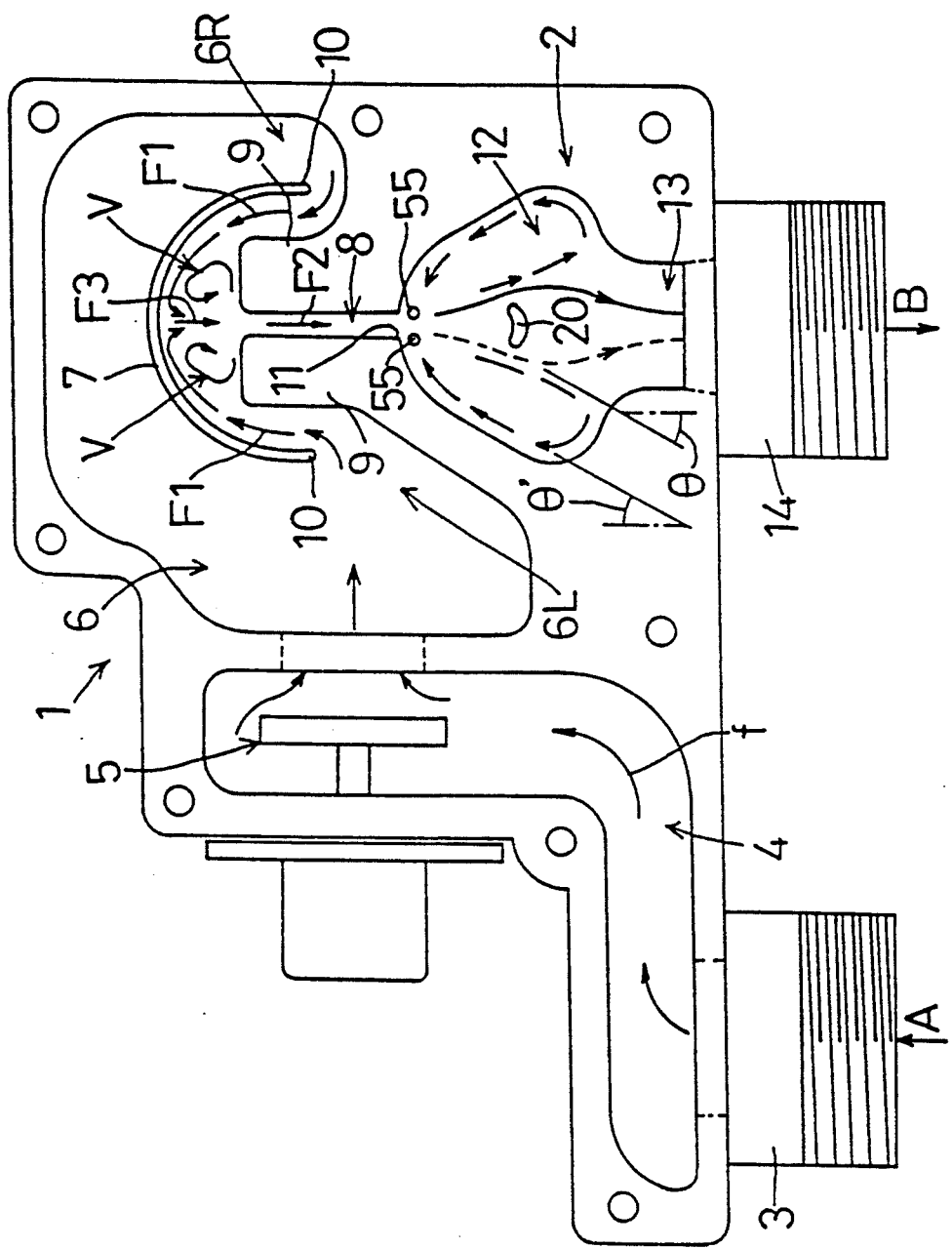
FIG. 1 is a plan view of a flow rate measuring device incorporating a fluid vibrating type flowmeter according to the present invention.
Figure 2:
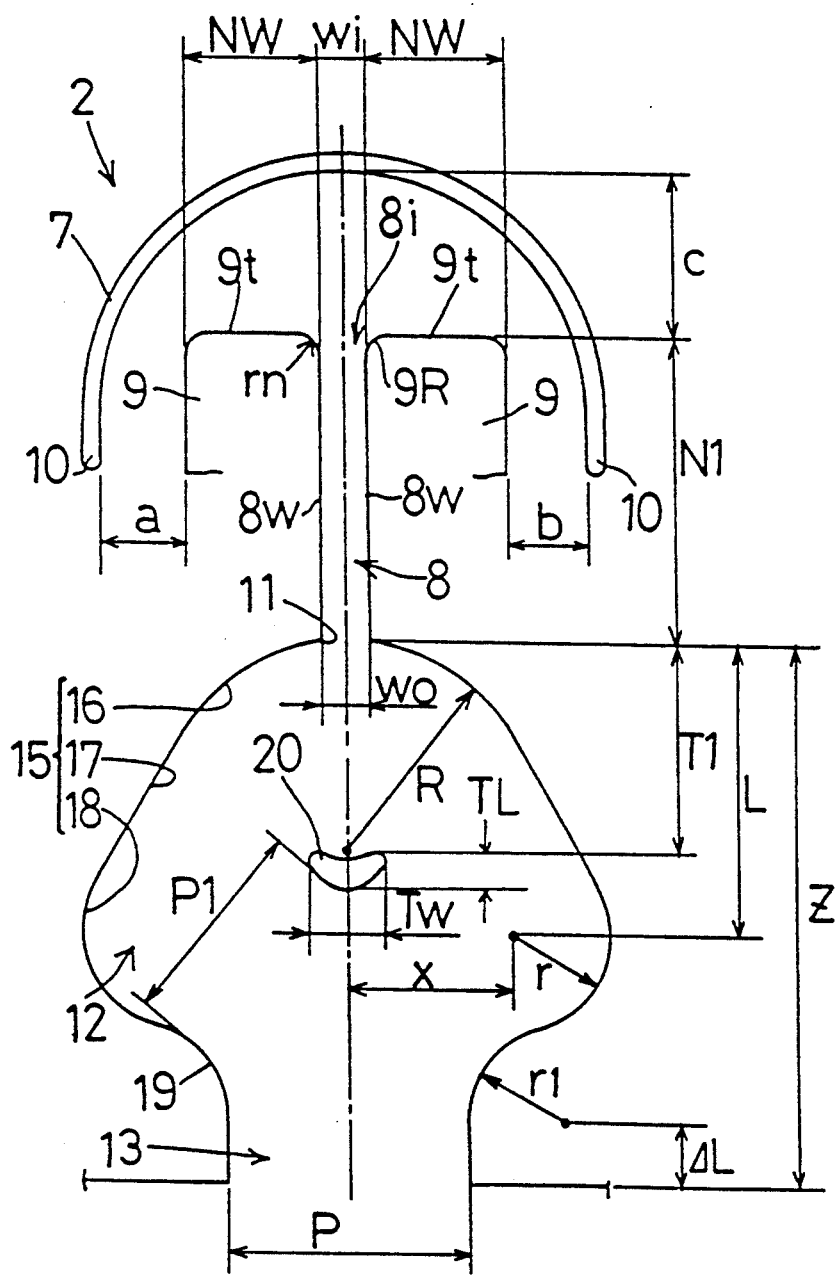
FIG. 2 is a plan view of the fluid vibrating type flowmeter according to the present invention.

FIGS. 1 and 2 show a flow rate measuring device incorporating this fluid vibrating type flowmeter. FIG. 1 is a plan view of the flow rate measuring device 1, while FIG. 2 shows details of a principal portion of the fluid vibrating type flowmeter 2 incorporated into the flow rate measuring device 1.

An outline of the flow rate measuring device 1 will be described first. In this device 1, an inflow direction A of fluid f to be measured is 180 degrees opposite of an outflow direction B thereof. Specifically, the fluid entering an inlet 3 of the device flows though a shut-off valve section 5 into a reservoir 6. The fluid is straightened by the flow straightener 7 disposed in the reservoir 6, and then flows into a nozzle 8. The fluid exits the nozzle 8 through an outlet plane 11 thereof in jet streams which become vibrating flows in an enlarged passage 12 of the fluid vibrating type flowmeter 2. Subsequently, the fluid flows out through a constricted passage 13 disposed downstream of the enlarged passage 12.

Each functional section and functions thereof will be described in greater detail hereinafter. The flows up to the nozzle 8 will be described first. The fluid f such as a gas or water flowing into the device inlet 3 is transmitted to the shut-off valve section 5 through a first curved passage 4 which is approximately L-shaped. After passing through the shut-off valve section 5, the fluid f flows into the reservoir 6. The flow straightener 7 is disposed in the reservoir 6. The flow straightener 7 has a semicircular configuration, and is opposed to an inlet 8i of the nozzle 8 of the fluid vibrating type flowmeter 2. The nozzle inlet 8i is defined by a pair of projections 9 extending into the reservoir 6.

The flow straightener 7 and the pair of projections 9 are in such a positional relationship that a pair of edges 10 of the flow straightener 7 are located downstream of a pair of inlet ends 9i of the projections 9 with respect to the passage direction. Consequently, a pair of detours F1 are formed between the pair of edges 10 and the pair of inlet ends 9i.

The fluid flows in opposite directions through the pair of detours F1, and its opposite flows join in a position above a center passage F3 connected to an interior passage F2 of the nozzle 8. A pair of vortex regions V are formed between the pair of detours F1 and the pair of inlet ends 9t. The fluid then flows through the nozzle 8 into the fluid vibrating type flowmeter 2.

The fluid f flows out through a device outlet 14 through the enlarged passage 12 and constricted passage 13 arranged downstream of the nozzle outlet plane 11 of the fluid vibrating type flowmeter 2.

The positional relationship between the flow straightener 7 and projections 9 may be expressed by the following equations using actual numeric values:

$a/(a+b) = 0.36$ to $0.54$ (0.47 in the example shown in FIGS. 5 through 9), and $c/wo = 3.0$ to $4.5$ (3.7 in the example shown in FIGS. 5 through 9), where a and b are widths of the respective detours, c is a maximum distance between the inlet ends 9t and flow straightener 7, and wo is a width of the nozzle outlet.

The construction of the nozzle 8 will be described next. The nozzle 8 includes the inlet having a width wi, the outlet having the width wo, and a pair of linear inner walls 8w extending between these opposite ends, to define a fixed flow straightening length N1. To obtain the flow straightening length N1, the pair of projections 9 extend into the reservoir 6 as noted hereinbefore. The pair of projections 9 are formed of square materials providing a width NW for each projection and a length N1 for each projection (which substantially corresponds to the above flow straightening length). Left and right reservoir areas 6L and 6R are formed on opposite sides of the nozzle 8. The left and right reservoir areas 6L and 6R have a width equal to or greater than the above flow straightening length N1. The projections 9 have rounded edges 9R for defining the inlet of the nozzle 8, where a radius of curvature rn is adopted as nozzle inlet curvature. Actual numeric values are as follows:

$wo = 3.2$ mm, $wi/wo = 0.9$ to $1.2$ (1.0 in the example shown in FIGS. 5 through 9), $rn/wo = 0.25$ to $0.62$ (0.31 in the example shown in FIGS. 5 through 9), $N1/wo = 5.0$ to $6.88$ (6.25 in the example shown in FIGS. 5 through 9), and $NW/wo = 2.30$ to $2.94$ (2.63 in the example shown in FIGS. 5 through 9).

The construction of the fluid vibrating type flowmeter 2 will be described further with reference to FIG. 2. This flowmeter 2 includes the nozzle 8, enlarged passage 12, and constricted passage 13 smoothly continuing from the enlarged passage 12. The outlet plane 11 of the nozzle 8 extends perpendicular to the passage direction.

The enlarged passage 12 has diverging inner wall surfaces 15 symmetric about a passage axis coinciding with the passage direction. Each inner wall surface 15 includes a main arcuate section 16 adjacent the nozzle outlet plane 11, a straight diverging wall section 17 continuous from the main arcuate section 16, and an auxiliary arcuate section 18 continuous from the straight diverging wall section 17. The auxiliary arcuate section 18 is connected at a rear end thereof to the constricted passage 13 through a discharge arcuate section 19. A target 20 is disposed centrally of the enlarged passage 12 for obstructing straight movement of the streams jetting out through the outlet plane 11.

Figure 4:
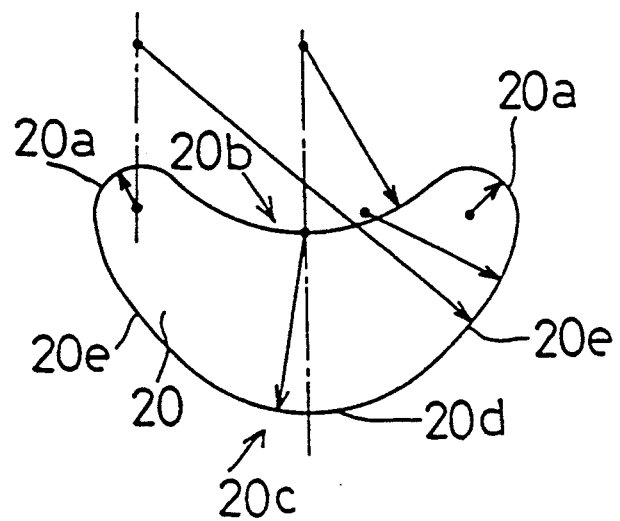
FIG. 4 is a view showing a construction of a target.
Figure 5:
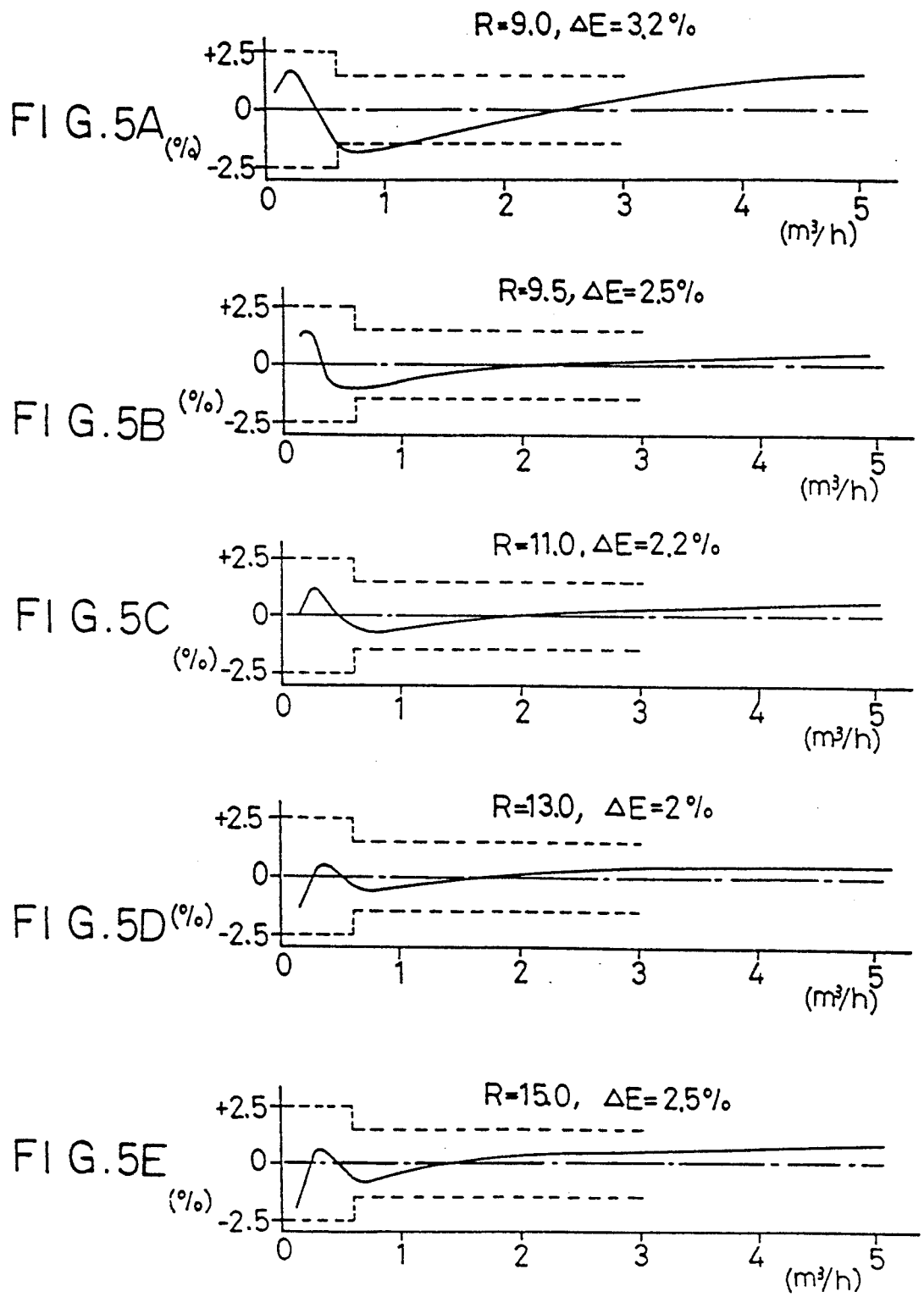
FIGS. 5(a) through (e) are views showing variations of flow rate/device difference characteristics occurring with variations in a first radius of a main arcuate section.

FIG. 4 shows a detailed construction of the target 20. This target 20 is symmetric about the passage axis, and includes left and right upstream arcuate sections 20a and an upstream recess 20b defined therebetween. The target 20 further includes a downstream bulge 20c. The bulge 20c defines a first arcuate section 20d having its center on the upstream recess, and second arcuate sections 20e concentric with the upstream arcuate sections 20a transversely of the passage. This target 20 produces an effect of stabilizing switching of jet stream flowing directions for very low flow rate ranges.

The dimensions wo, R, L, x, r, Tw, T1 and P are in the following relations:

$R/wo = 3.0$ to $4.7$, $L/R = 1.5$, $x/R = (\sqrt{3})/2$, $r/R = 0.5$, $Tw/wo = 1.56$ to $2.00$ (1.75 in the example shown in FIGS. 5 through 9), $T1/R = 0.94$ to $1.1$, and $P/R = 1.24$ to $1.62$ (1.36 in the example shown in FIGS. 5 through 9), where R is a first radius of the main arcuate section 16, L is a first distance in the passage direction of the outlet plane 11 to the center of curvature of the auxiliary arcuate section 18, x is a second distance transversely of the passage of the center of curvature of the auxiliary arcuate section 18 to the passage axis, r is a second radius of the auxiliary arcuate section 18, Tw is a width of the target 20, T1 is a distance in the passage direction of the outlet plane 11 to upstream ends of the target 20, and P is a width of the constricted passage 13.

The discharge arcuate section 19 has a radius r1 corresponding to the second radius r (or R/2). The enlarged passage 12 has a maximum transverse dimension $2(x+r)/R = 2.73$.

Further, the distance T1 in the passage direction of the outlet plane 11 to the upstream ends of the target 20, and a distance P1 between the target 20 and the discharge arcuate section 19 are maintained in a relationship that T1/P1 is 0.94 to 1.05 (1 in the illustrated example). Where, as in this embodiment, the minimum distance P1 between the target and discharge arcuate section substantially corresponds to the distance T1 between the nozzle outlet plane and the front face of the target, the main jet streams are smoothly discharged from downstream passage portions formed between the target and the discharge arcuate sections, thereby effectively inducing fluid vibrations. This feature provides the advantage of the flow rate/device difference characteristics meeting the allowance criterion.

Where the center of curvature of the discharge arcuate section 19 has a distance $\Delta L$ to a rear end of the fluid vibrating type flowmeter 2, $\Delta L/R$ is 0.15 to 0.7 (0.3 in the illustrated example). The nozzle outlet plane 11 has a distance Z to the rear end of the fluid vibrating type flowmeter 2, which is 2.59 to 3.14R.

The actual value of R is 13.0 mm. This fluid vibrating type flowmeter 2 has a height of 23 mm (which is a width perpendicular to the sheet of FIG. 2), but this value is not limitative.

In rendering the flowmeter's relevant dimensions R, L, x, r, T1 and P dimensionless, L, x, T1 and P are selected with reference to R. The reason is that, according to the construction shown in FIG. 1, an angle $\theta$ of bending of the main jet flows is substantially parallel to an angle $\theta'$ of main return flows.

Results of measurement by this fluid vibrating type flowmeter 2 will be described hereinafter. FIG. 5(d) shows flow rate/device difference characteristics. As seen from this figure, high flow rates at 0.6 m³ per hour and above are measured with high precision with errors not exceeding ±0.8%, and low flow rates at 0.1 to 0.6 m³ per hour measured with errors not exceeding 0.5 to −1.5%, which are well within the tolerance stipulated under the Weight and Measure Act (not exceeding ±2.5%). Thus, the fluid vibrating type flowmeter is capable of measurement with high precision and is well fit for practical use. The lower limit flow rate for oscillation is on the order of 65 liters per hour, and oscillation is possible up to about 50 in Reynolds number, which are extremely good results.

Results of experiments carried out by Inventors will be described next.

EXPERIMENT 1

Figure 6:
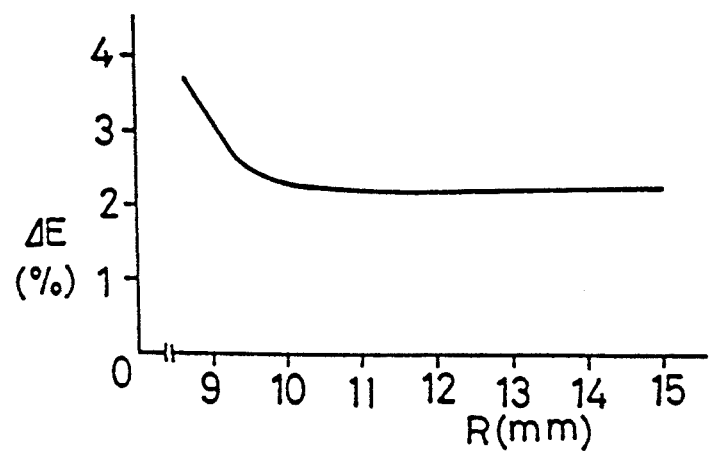
FIG. 6 is a view showing variations of $\Delta E$ occurring with variations in the first radius of the main arcuate section.

This experiment was carried out to examine variations in flow rate/device difference characteristics of similar fluid vibrating type flowmeters having dimensional relations similar to those in the foregoing embodiment, with the first radius of the main arcuate section varied (R was varied from 9.0 mm to 15.0 mm). Results of Experiment 1 are shown in FIGS. 5(a) through (e) and FIG. 6. FIGS. 5(a) through (e) show the flow rate/device difference characteristics and $\Delta E$ of the flowmeters having varied R values. FIG. 6 shows variations of $\Delta E$, in which the horizontal axis represents the first radius R and the vertical axis represents $\Delta E$.

The results show that, as far as these dimensional relations are concerned, measurement errors meet the allowance criterion if R is 9.5 or more. Where R is at this value or more, the flow rate/device difference characteristics never deteriorate for low flow rates. Thus, the fluid vibrating type flowmeter according to the present invention operates well for the range of R=9.5 or more.

EXPERIMENT 2

Figure 7:
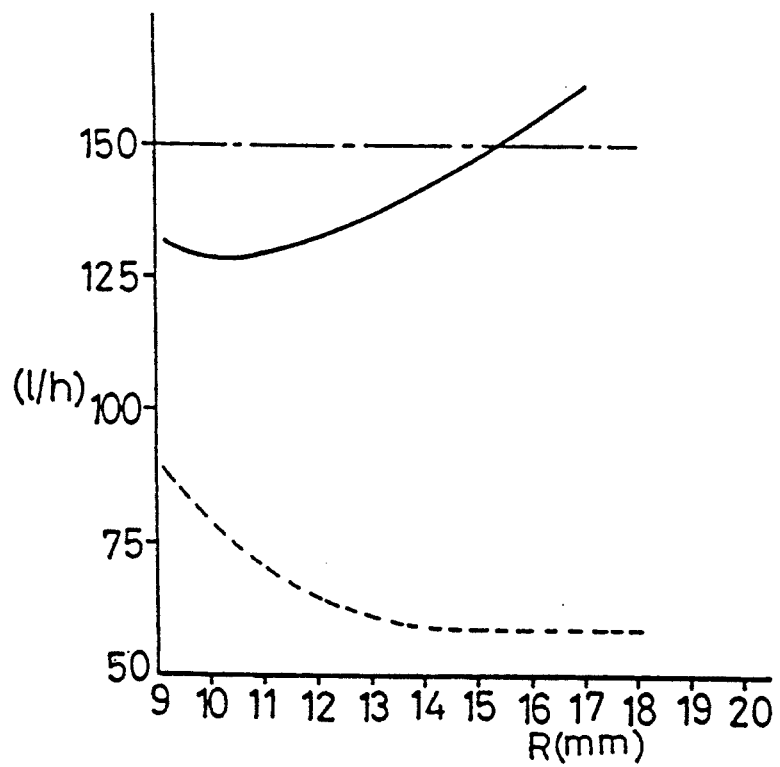
FIG. 7 is a view showing lower limit flow rates for measurement and for oscillation occurring with variations in the first radius of the main arcuate section.

This experiment was carried out to examine variations in the lower limit flow rate for measurement (which is generally called dynamic range ability and determines an actual lower limit for measurement) and in the lower limit flow rate for oscillation (which is generally called range ability and is an actual lower limit for oscillation of a fluid) of similar fluid vibrating type flowmeters having dimensional relations similar to those in the foregoing embodiment, with the first radius of the main arcuate section varied (R was varied from 9.0 mm to 15.0 mm). Results of Experiment 2 are shown in FIG. 7. FIG. 7 shows the lower limit flow rate for measurement (in a solid line) and lower limit flow rate for oscillation (in a broken line) of the flowmeters having varied R values.

As seen, the results show that the lower limit flow rate for measurement has characteristics approximately parallel to the horizontal axis for a range of R approximately 9 to 11 mm. In this case, the lower limit flow rate is about 130 liters per hour. With an increase of R over this value, the lower limit flow rate increases gradually.

However, since the legal lower limit flow rate for measurement for meters with notation 3, for example, is 150 liters per hour as shown in a dot-and-dash line in FIG. 7, this requirement is fully met as long as the first radius R is 15 mm or less.

The lower rate flow rate for oscillation is far lower than the lower rate flow rate for measurement. The lower rate flow rate for oscillation decreases successively with an increase in the value of R, and extends approximately parallel to the horizontal axis after R exceeds the range of 14 to 15 mm.

It is seen from the above results that the principal configuration (the radius of the main arcuate section, the radius of the auxiliary arcuate section, and the position of the center of curvature of the auxiliary arcuate section) of the fluid vibrating type flowmeter may follow the settings as in the foregoing embodiment. The size, taking a meter with notation 3 for example, may be in the range R=9.5 to 15.0 confirmed in Experiments 1 and 2 or, in the ratio thereof with respect to the width wo of the nozzle outlet, may be in range R/wo=3.0 to 4.7.

EXPERIMENT 3

Figure 8:
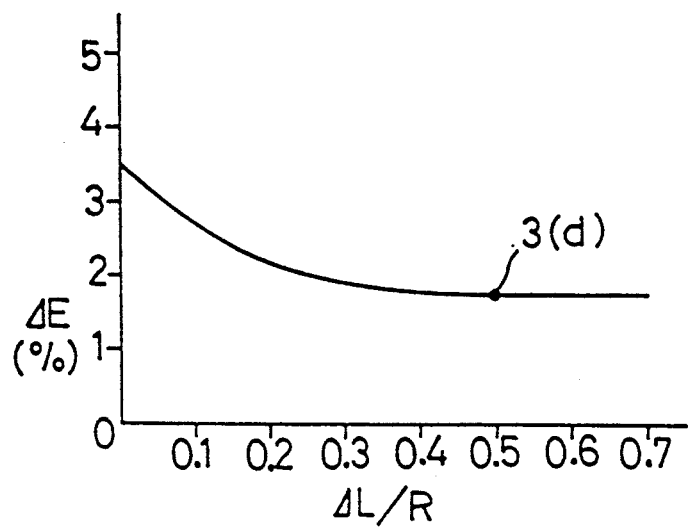
FIG. 8 is a view showing variations in $\Delta E$ occurring with variations in $\Delta L/R$.
Figure 9:
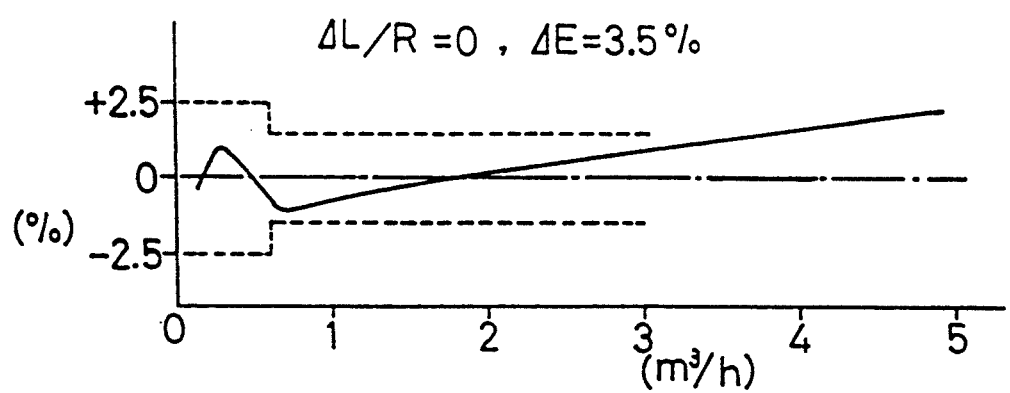
FIG. 9 is a view showing flow rate/device difference characteristics occurring when $\Delta L/R$ is 0.

This experiment was carried out on vibrating type flowmeters having dimensional relations similar to those in the foregoing embodiment, to examine variations in $\Delta E$ occurring with variations in the ratio of distance $\Delta L$ from the center of curvature of the discharge arcuate section to the rear end of the constricted passage with respect to the first radius R of the main arcuate section. Results of Experiment 3 are shown in FIGS. 8 and 9. In FIG. 8, the horizontal axis represents $\Delta L/R$ and the vertical axis represents $\Delta E$. FIG. 9 shows flow rate/device difference characteristics occurring when $\Delta L/R$. The flow rate/device difference characteristics occurring when $\Delta L/R=0$ in FIG. 8 are shown in FIG. 5(d).

The results show that $\Delta E$ decreases in a simple way with an increase of $\Delta L$ while $\Delta L/R$ is in the range of 0 to 0.3, and settles below 2% with further increases of $\Delta L$.

Generally, values of $\Delta E$ up to 3% are allowed, and the appropriate range of $\Delta L$ is 0.15 and above. By setting low limits to these values, the fluid vibrating type flowmeter may advantageously have a reduced length in the passage direction.

On the other hand, the dimensions wo, R, L, x, r, Tw, TL and P are in the following relations:

R/wo=3.0 to 4.7 (3.9 in the example shown in FIGS. 10 and 11),
L/R=1.5,
x/R=($\sqrt{3}$)/2,
r/R=0.5,
Tw/wo=1.56 to 2.00 (1.75 in the example shown in FIGS. 10 and 11),
TL/wo=1.0 to 1.5, and
P/R=1.24 to 1.62 (1.36 in the example shown in FIGS. 10 and 11), where R is the first radius of the main arcuate section 16, L is the first distance in the passage direction of the outlet plane 11 to the center of curvature of the auxiliary arcuate section 18, x is the second distance transversely of the passage of the center of curvature of the auxiliary arcuate section 18 to the passage axis, r is the second radius of the auxiliary arcuate section 18, Tw is the width of the target 20, TL is a length of the target 20, and P is the width of the constricted passage 13.

Results of measurement by this fluid vibrating type flowmeter 2 will be described hereinafter.

Figure 11A:
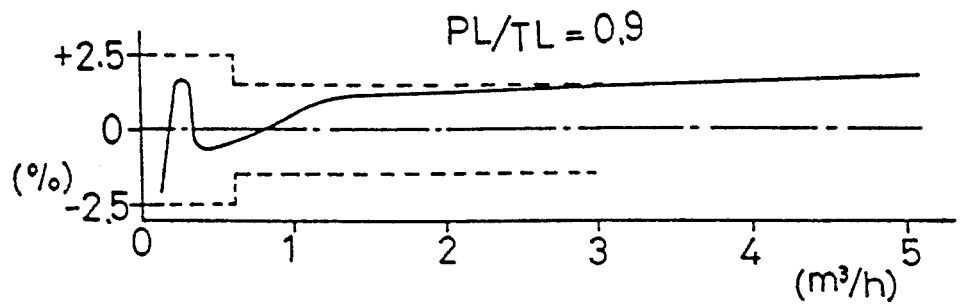
Figure 11B:
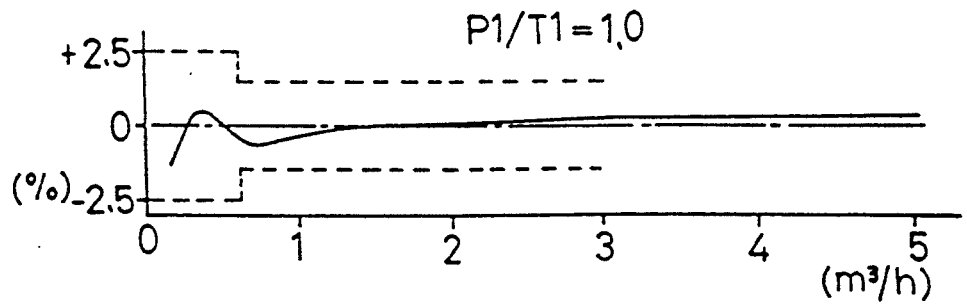

FIG. 11(b) shows flow rate/device difference characteristics. As seen from this figure, high flow rates at 0.6 m³ per hour and above are measured with high precision with errors not exceeding ±0.8%, and low flow rates at 0.1 to 0.6 m³ measured with errors not exceeding 0.5 to −1.5%, which are well within the tolerance stipulated under the Weight and Measure Act (not exceeding ±2.5%). Thus, the fluid vibrating type flowmeter is capable of measurement with high precision and is well fit for practical use. The lower limit flow rate for oscillation is on the order of 65 liters per hour, and oscillation is possible up to about 50 in Reynolds number, which are extremely good results.

Results of an experiment carried out by Inventors on this embodiment will be described next.

EXPERIMENT 4

This experiment was carried out to examine variations in flow rate/device difference characteristics of a flowmeter occurring with variations of P1/T1 where T1 is the distance between the nozzle outlet plane and the front face of the target, and P1 is the minimum distance between the target and discharge arcuate section, with the other conditions maintained the same as in the processing embodiment.

Figure 10:
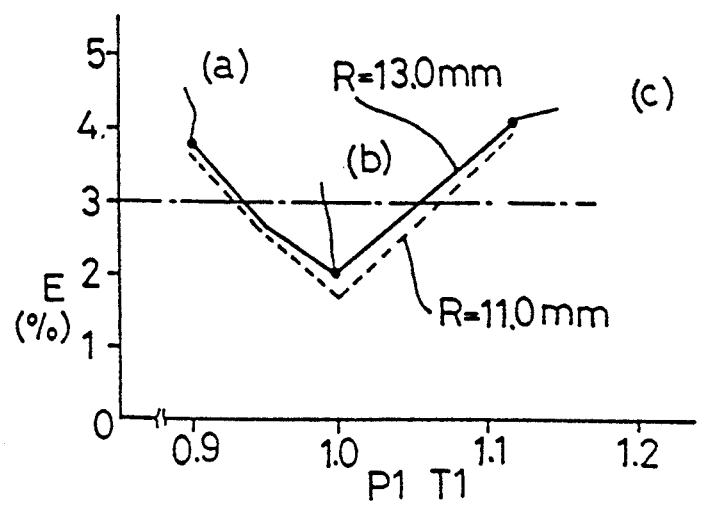
FIG. 10 is a view showing a relationship between $P1/T1$ and maximum error, FIGS. 11(a), (b) and (c) are views showing flow rate/device difference characteristics occurring with variations in $P1/T1$.
Figure 11C:
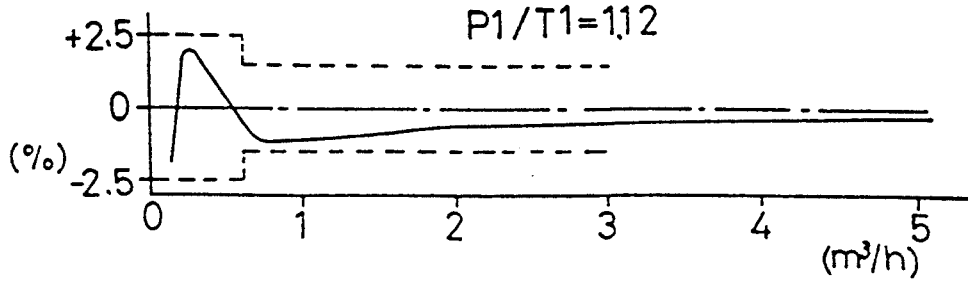
Figure 12:
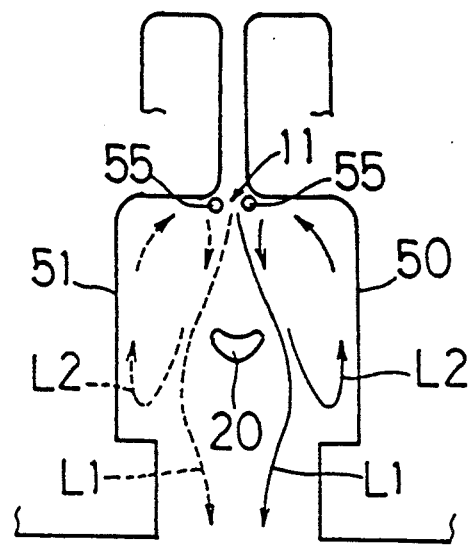
FIG. 12 is a view showing the construction of a fluid vibrating type flowmeter known in the art.
Figure 13:
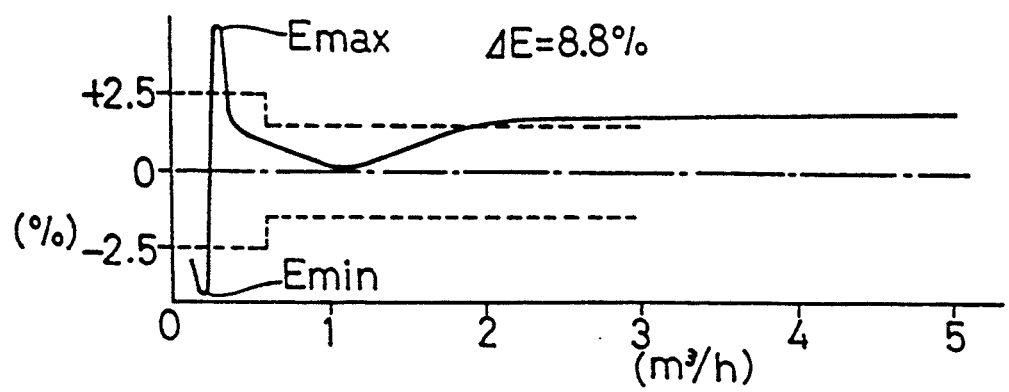
FIG. 13 is a view showing flow rate/device difference characteristics of the known fluid vibrating type flowmeter.

FIG. 10 shows variations of maximum error ΔE for P1/T1, and FIG. 11 shows flow rate/device difference characteristics of typical conditions in FIG. 10.

Referring to FIG. 10 first, the horizontal axis represents P1/T1 and the vertical axis represents maximum error ΔE. In FIG. 10, the first radius of 13.0 mm is shown in a solid line, and that of 11.0 mm is shown in a broken line.

As seen from FIG. 10, with a straightforward increase of P1/T1, ΔE decreases first and then increases after P1/T1 is 1.

The value of P1/T1 is in the rage of 0.94 to 1.05 when the maximum error characteristic ΔE is 3 or less which is an ordinary criterion for ordinary fluid vibrating type flowmeters.

Next, FIGS. 11(a), (b) and (c) show flow rate/device difference characteristics occurring when P1/T1 is 0.9, 1.0 and 1.12 in FIG. 10, respectively. As seen from these drawings, errors for a high flow rate range are on the plus side when this value is small, and excellent results are obtained when P1/T1 is around 1. When this value is large, errors are increased for a low flow rate range and as a whole, and move to the plus side in the low flow rate range.

Other embodiments will be described hereinafter.

(a) In the foregoing embodiments, the diverging wall sections 17 are formed straight. These wall sections may have any configuration as long as they diverge downstream.

Figure 3:
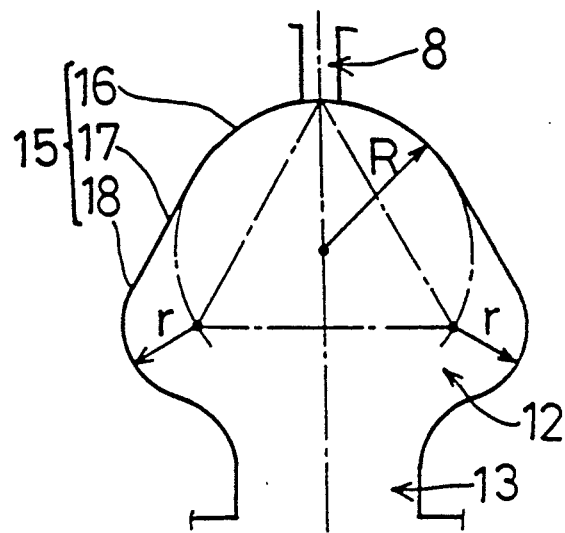
FIG. 3 is an explanatory view of geometric characteristics of the fluid vibrating type flowmeter according to the present invention.

(b) In the foregoing embodiments, the first radius R, the second radius r, and the second distance x transversely of the passage of the center of the auxiliary arcuate section 18 to the passage axis are in the relations r/R=0.5, and x/R=(√3)/2 (in the flowmeter having these numeric relations, principal numeric values of the main arcuate section and auxiliary arcuate section are in simple relations, as shown in FIG. 3). However, the following relations may be adopted:

r/R=0.45 to 0.56, and
x/R=0.7 to 1.0.

In this case, the fluid vibrating type flowmeter may have a vertically elongated construction.

What is claimed is:

1. A fluid vibrating type flowmeter comprising:

a nozzle disposed in a flow passage and defining a nozzle outlet plane extending perpendicular to said flow passage;

an enlarged passage disposed downstream of said nozzle and including divergent inner wall surfaces symmetric about an axis of said nozzle;

a target disposed centrally of said enlarged passage for obstructing straight movement of streams jetting out of said nozzle; and a constricted passage disposed downstream of said enlarged passage and having a smaller passage width than a rear end of said enlarged passage;

wherein each of said divergent inner wall surfaces includes a main arcuate section continuous from said nozzle outlet plane and having a first radius R, a straight diverging wall section smoothly continuous from said main arcuate section, and an auxiliary arcuate section continuous at an upstream end thereof from said straight diverging wall section and at a downstream end thereof with said constricted passage, said auxiliary arcuate section having a second radius r, said straight diverging wall section being formed as a common tangent of said main arcuate section and said auxiliary arcuate section, and said first radius R and said second radius r are in relations expressed by $$r/R = 0.5$$
$$L/R = 1.5, \text{ and}$$
$$x/R = (\sqrt{3})/2,$$

where L is a first distance in a passage direction of said nozzle outlet plane to the center of curvature of said auxiliary arcuate section, and x is a second distance transversely of said passage of the center of curvature of said auxiliary arcuate section to a passage axis.

2. A fluid vibrating type flowmeter as claimed in claim 1, wherein said first radius R of said main arcuate section is in a relationship R/wo=3.0 to 4.7 with a width wo of an outlet of said nozzle.

3. A fluid vibrating type flowmeter as claimed in claim 2, wherein said constricted passage is formed as a passage extending parallel to the passage axis and connected to said auxiliary arcuate section through a discharge arcuate section converging toward said passage, and wherein the following equations are established:

P/R=1.24 to 1.62,
Z/R=2.59 to 3.14, and
ΔL/R=0.15 to 0.7, where P is a width of said constricted passage, Z is a distance in the passage direction from said nozzle outlet plane to a rear end of said constricted passage, and ΔL is a distance in the passage direction from the center of curvature of said discharge arcuate section to the rear end of said constricted passage.

4. A fluid vibrating type flowmeter as claimed in claim 3, wherein said auxiliary arcuate section is connected at a rear end thereof to said constricted passage through said discharge arcuate section.

5. A fluid vibrating type flowmeter comprising:

a nozzle disposed in a flow passage and defining a nozzle outlet plane extending perpendicular to said flow passage;

an enlarged passage disposed downstream of said nozzle and including divergent inner wall surfaces symmetric about an axis of said nozzle;

a target disposed centrally of said enlarged passage for obstructing straight movement of streams jetting out of said nozzle; and a constricted passage disposed downstream of said enlarged passage and having a smaller passage width than a rear end of said enlarged passage;

wherein each of said divergent inner wall surfaces includes a main arcuate section continuous from said nozzle outlet plane and having a first radius R, a straight diverging wall section smoothly continuous from said main arcuate section, and an auxiliary arcuate section continuous at an upstream end thereof from said straight diverging wall section and at a downstream end thereof with said constricted passage, said auxiliary arcuate section having a second radius r, said auxiliary arcuate section and said constricted passage being interconnected through a discharge arcuate section converging toward said passage, and said passage being constricted at a position downstream of said target by said target and said discharge arcuate section, and a minimum distance P1 between said target and said discharge arcuate section substantially corresponds to a distance T1 between said nozzle outlet plane and a front face of said target.

6. A fluid vibrating type flowmeter as claimed in claim 5, wherein the following equations are established:

$$Tw/wo = 1.56 \text{ to } 2.00,$$
$$TL/wo = 1.0 \text{ to } 1.5,$$
$$P1/T1 = 0.94 \text{ to } 1.05,$$
$$R/wo = 3.0 \text{ to } 4.7,$$
$$r/R = 0.5,$$
$$L/R = 1.5,$$

$$x/R = (\sqrt{3})/2,$$

$$R1/R = 0.5, \text{ and}$$
$$P/R = 1.24 \text{ to } 1.62,$$

where wo is a width of the nozzle outlet, Tw is a width of said target, TL is a length of said target, T1 is the distance between the nozzle outlet plane and the front face of said target, P1 is the minimum distance between said target and said discharge arcuate section, r is the second radius of said auxiliary arcuate section, L is a distance in the passage direction of said nozzle outlet plane to the center of curvature of said auxiliary arcuate section, x is a second distance transversely of the passage of the center of curvature of said auxiliary arcuate section to the passage axis, r1 is a radius of said discharge arcuate section, and P is a width of said constricted passage.

* * * * *